Figure 1:
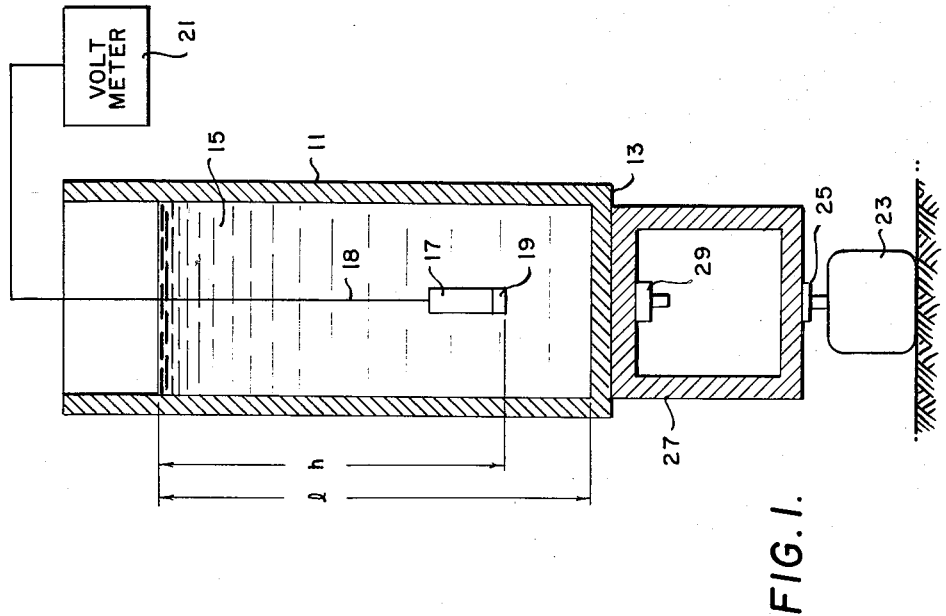

Dec. 21, 1965     F. SCHLOSS ETAL     3,224,246

LOW FREQUENCY HYDROPHONE CALIBRATION

Filed July 15, 1963     2 Sheets-Sheet 1

INVENTOR.
FRED SCHLOSS
MURRY STRASBERG

BY

ATTY.

AGENT.

United States Patent Office 3,224,246
Patented Dec. 21, 1965

3,224,246
LOW FREQUENCY HYDROPHONE
CALIBRATION
Fred Schloss, Arlington County, Va., and Murray Strasberg, Montgomery County, Md., assignors to the United States of America as represented by the Secretary of the Navy
Filed July 15, 1963, Ser. No. 295,256
14 Claims. (Cl. 73—1)
(Granted under Title 35, U.S. Code (1952), sec. 266)

The invention described herein may be manufactured and used by or for the Government of the United States of America for governmental purposes without the payment of any royalties thereon or therefor.

The present invention relates to low frequency hydrophone calibration and more particularly to means and methods of hydrophone calibration closely approximating that of calibration of hydrophones in situ.

According to an embodiment of the present invention the hydrophone to be calibrated is freely suspended and immersed in a container-held liquid pool. The container is set in vibratory motion by suitable oscillatory driving means to produce elastic waves in the liquid of sufficient intensity to measurably affect the output of the hydrophone. The hydrophone output represents acoustic pressure generated by the elastic waves acting on the sensitive element of the hydrophone.

It is typical of prior art arrangement to calibrate hydrophones by shaking the hydrophone while holding its environmental fluid-filled container stationary. In such systems error is introduced into measurements because of the hydrophone's response to its own acceleration. This in turn places a limit on the extent of vibratory motion to which the hydrophone may be subjected.

Another difficulty in prior art systems is brought about by the fact that measurement of the acceleration amplitude displacement of the vibrating hydrophone is difficult because the container surrounding the hydrophone is motionless. Expensive and sophisticated equipment is therefore required to obtain this displacement measurement.

And it is usual in prior calibration systems that the entire environmental hydrophone testing apparatus consists of a fluid handling system with delicately interrelated varying pressures. In these systems expensive test-control and monitoring equipment is required to maintain proper fluid pressures. Also the working fluid must be de-gassed to prevent calibration error.

These and other disadvantages of the prior art are overcome by the present novel calibration arrangement which affords a truly portable calibrator of very economical and simple novel design. Under the present invention, the only quantities which need be known in calculating acoustic pressure and hydrophone sensitivity are the liquid density $\rho$, the acceleration amplitude $\ddot{x}_0$ and frequency of vibration $\omega$, the pool depth L and the depth $h$ of the sensitive element of the hydrophone under test. All of these quantities may be determined within 0.1% with the present novel arrangement. The calibrator of the invention provides high acoustic pressure in excess of 1000 dyn./cm.² so that measurements of low sensitivity hydrophones such as blast gages and simple probes may be made.

Further, the uniquely simple arrangement of the present invention affords easy insertion and removal of hydrophones being tested because there are no elaborate pressure-related interconnections involved. Of importance also is the advantage that the present novel apparatus is not deleteriously affected by ambient temperatures. Consequently, a hydrophone may be calibrated for sensitivity in various predetermined temperature ranges with good predictability of results.

Accordingly, it is an object of this invention to provide a simple, rugged, inexpensive and portable hydrophone calibrator of novel design which affords calibration closely approximating free field calibration.

An associated object of this invention is the provision of a hydrophone calibrator unit comprised of simple equipment components and minimum of ancillary test equipment to enhance the portability of the unit.

Another object of the present invention is to provide a calibration unit having means for producing acoustic pressures sufficiently high so that relatively low sensitivity hydrophones may be calibrated, and so that higher sensitivity hydrophones may be calibrated without need of signal amplifying equipment for the hydrophone.

A further object of this invention is the provision of a uniquely simple and novel direct coupling arrangement between a vibratory source and the container to be set into vibratory motion for the purpose of hydrophone calibration.

Still another object of this invention is the elimination of gas or fluid coupling as a critical factor in a calibrator.

Another object of this invention is to provide a sturdy environmental test container of unitary construction and capable of withstanding high pressure differentials so that calibration of a hydrophone immersed inside the container may be carried out under high hydrostatic pressures simulating deep submergence.

And another object of the present invention is to provide a novel hydrophone calibrator design which permits ascertainment of the values of necessary input parameters to a great degree of accuracy without the need of sophisticated measuring equipment.

Figure 2:
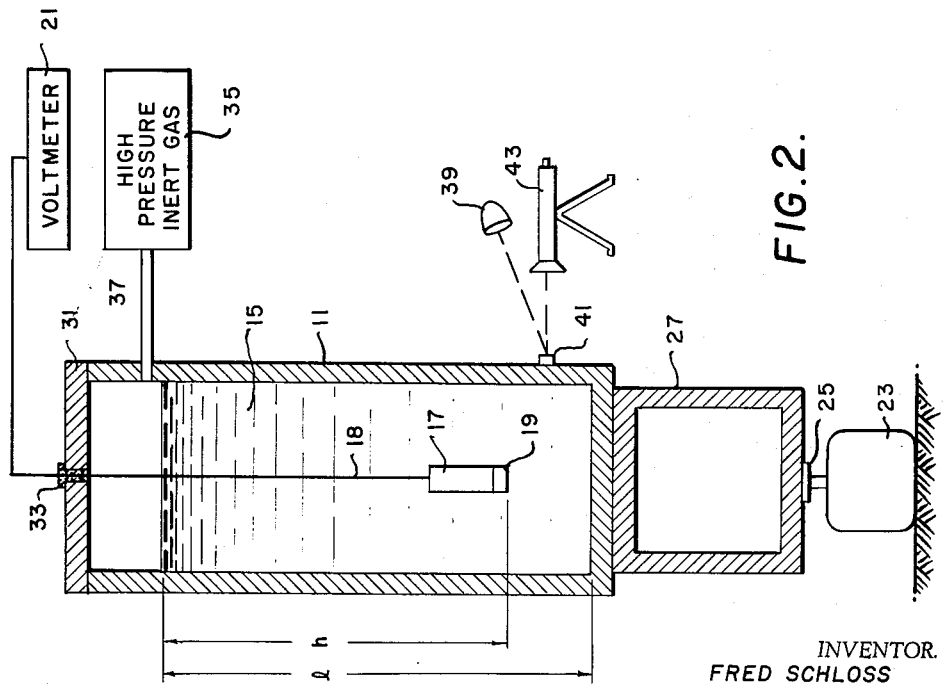
Figure 3:
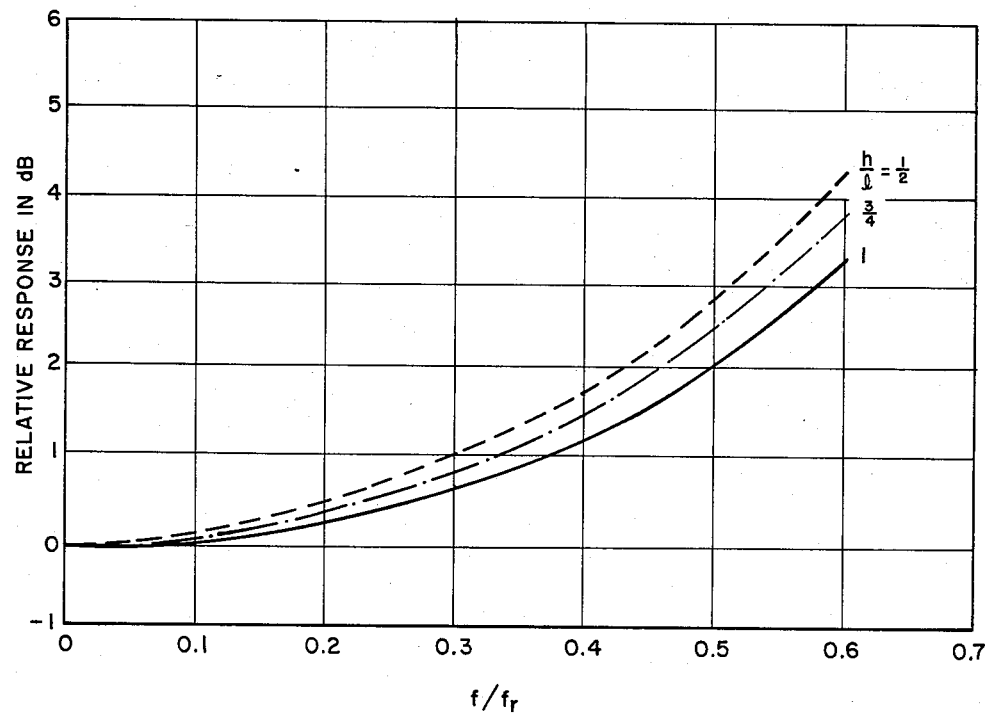

These and other objects, features and advantages of this invention will be better understood by referring to the drawings in which like numerals represent like parts, and in which:

FIGS. 1 and 2 each is a combination block diagram and modified cross sectional view of a hydrophone calibrator according to different embodiments of the invention; and FIG. 3 is a graph illustrating wave correction effects for high vibration testing frequencies.

Referring to the drawings, the embodiment illustrated in FIG. 1 is provided with an open-top metallic environmental test container 11 having sufficiently thick walls and an integral bottom 13 to withstand high acoustic pressures and to insure a mechanical resonance frequency well above test frequencies.

The container 11 holds a pool of liquid 15 to a depth L. The liquid may be water, mercury, glycerine, or any other suitable liquid. Glycerine may be preferred in some instances because the velocity of elastic waves therein is higher, thereby increasing the upper cutoff frequency.

The hydrophone 17 to be calibrated is suspended by means of its leads 18 or additional cables independently of the container 11 so that the hydrophone is always at least essentially motionless therein during testing. The hydrophone 17 has a sensitive element 19 (such as a piezo-electric crystal, etc.) which is located at a depth $h$ in the pool 15. The sensitive element 19 is directly connected by means of suitable suspended leads 18 to a voltmeter 21 located outside the container.

The voltmeter 21 provides an output voltage proportional to the acoustic pressure.

The container 11 is vibrated along its vertical axis by means of any suitable vibration generating or driving apparatus 23 coupled directly thereto. For example, such driving apparatus may take the form of a hydraulically actuated shake table, a mechanical shaker providing up and down oscillating motion by means of an eccentric driven by a conventional motor, or a solenoid having a vibrating armature connected for imparting vibrations to the bottom of the container 11. Inasmuch as these mechanisms are well known, they are not described in detail.

In the embodiment illustrated in FIG. 1 the driving apparatus 23 is mechanically coupled through a vibration transmitting member 25 to a box-like vibration table 27 having its top member suitably secured to the container bottom 13 and its bottom secured to the vibration transmitting member 25. An accelerometer 29 housed in the table 27 is fixed to the bottom of the upper portion of the table 27. Any suitable readout means may be provided for the accelerometer 29 so that the acceleration amplitude $\ddot{x}_0$ of the container bottom when vibrated may be observed or rendered as a voltage output proportional thereto.

The embodiment illustrated in FIG. 2 is similar to that of FIG. 1 except that additional means are provided for simulation of deep submergence for test purposes. Also, instead of an accelerometer, externally located optical means are alternatively provided to determine the displacement amplitude $x_0$. Specifically, the container 11 is provided with a suitable fluidtight sealing cap 31 which, like the container 11, is capable of withstanding high pressure. The usual securing and sealing means for such a cap are not shown in detail as they are well known. The cap 31 has a stuffing tube 33 through which the leads from the hydrophone 17 to the voltmeter 21 may be fluid-tightly and pressure-tightly passed.

A source of high pressure gas 35 is coupled to the upper portion of the container 11 via a conduit 37. After the cap 31 is fastened to the top of the container 11 with the hydrophone 17 immersed in the liquid pool 15, high pressure gas (preferably inert to avoid the possibility of explosion), is introduced into the container in known or programmed stages to simulate various depths during testing.

Since according to the invention the container 11 itself is shaken or vibrated to produce high pressures in the liquid pool or column 15, the displacement amplitude $x_0$ may advantageously be determined by means of an externally located optical system. The optical system employed includes a strobe light 39 directing a beam of light toward a reticle 41 located on the outside surface of a wall of the container 11. A microscope 43 is focused on the reticle 41 for receiving radiation from the strobe 39. The microscope 43 has an appropriately calibrated scale for indicating the displacement of the light beam. At known strobe frequencies the displacement amplitude $x_0$ is directly observable in the microscope 43. Ordinarily, the frequency of vibration oscillation is known. However, the optical system just described may be used to further check the value of this frequency because the reticle 41 inherently acts as a strobe mark.

By way of theoretical explanation, when the liquid column 15 is shaken or vibrated up and down, the pressure in the liquid at a point relative to an inertial frame oscillates, due not only to variation in hydrostatic head, but also because of the alternating pressure gradient required to accelerate the liquid. If the entire body of liquid moves uniformly so that every particle departs by the same amount $x$ from its mean position, then the instantaneous departure P of the pressure from its mean at the depth $h$ is:

$$P = \rho g x + \rho h \ddot{x} \quad (1)$$

where $\rho$ is the density of the liquid in pool 15, $\ddot{x}$ is the acceleration of the liquid and $g$ is acceleration due to gravity. If the oscillations as applied to the container are sinusoidal at a radian frequency $\omega$, then the pressure amplitude is related to the displacement amplitude by:

$$P_0 = \rho x_0 (g - \omega^2 h) \quad (2)$$

The first term on the right hand side of Equation 2 is associated with oscillating static head, and the second, with alternaintg acceleration. At a frequency of 10 c.p.s. and a depth of $h=10$ cm., the acceleration term is 40 times the static head term. With an acceleration of $0.1g$ at this depth, the alternating pressure amplitude in water is about 1000 dyn./cm.$^2$ If the shape of the hydrophone 17 is a sphere of radius, $a$, and if $h \gg a \gg x_0$, then the presence of the hydrophone will have negligible effect on the calibration pressure if its cross section is much smaller than the depth of submergence and much larger than the amplitude of vibration.

At higher frequencies the sensitive element depth $h$ becomes comparable in distance with the wavelength of sound in liquid, and particle motion is no longer uniform due to perturbation by wave effects. These effects are taken into account by using a well-known expression for the specific acoustic impedance of an open-ended tube of fluid. At depth $h$, the alternating pressure at the location of the sensitive element 19 is given in terms of the local acceleration $\ddot{x}_h$ by $$P = \rho h \ddot{x}_h \left[ \frac{\tan \omega h/c}{\omega h/c} \right] \quad (3)$$

$c$ being the velocity of sound in the liquid pool 15 taking into account the compliance of the container walls. The oscillating static head is assumed negligible. The acceleration $\ddot{x}_h$ at depth $h$ is related to the acceleration $\ddot{x}_1$ at the bottom of the liquid column as follows:

$$\ddot{x}_h / \ddot{x}_1 = [\cos \omega h/c] \, [\cos \omega L/c]^{-1} \quad (4)$$

where L, as shown in FIG. 1, is the height of the liquid column in the container 11.

By combining Equations 3 and 4, the pressure $P_h$ at the depth of the sensitive element 19 is related to the acceleration at the bottom of the container as follows:

$$P = \rho h \ddot{x}_1 \frac{\sin (\omega h/c)}{(\omega h/c) \cos (\omega L/c)} \quad (5)$$

The fraction in Equation 5 represents the perturbation due to wave effects; it approaches unity at low test frequencies. Equation 5 can thus be used to calculate the calibration pressure if it is desired to perform calibrations at frequencies where wave effects exist. For example, if $L=2h$, and $L=\frac{1}{8}$ wavelength, the correction factor of Equation 5 is 1.38 (about 3 db). The value of the wave perturbation as a function of frequency and of ($h/L$) is plotted in the graph of FIG. 3. As indicated in the legend, FIG. 3 shows a plot of relative response in db versus the ratio of the test frequency $f$ to the frequency of the first standing wave $f_r$, for the container.

Absolute-pressure calibrations generally assume an incompressible (very high impedance) hydrophone. The calibration procedure according to the invention permits evaluation of the effect of change of the impedance of the liquid testing medium on the hydrophone sensitivity.

In that the specific acoustic impedance at depth $h$ is known, by performing calibration at various depths in the container 11 it is possible to determine the effect, if any, of a change in impedance on the hydrophone sensitivity. By choosing a depth $h$ equal to one-eighth wavelength, there is obtained an impedance whose magnitude equals $\rho c$, that is, the impedance of a progressive plane wave. However, this impedance is reactive rather than resistive.

In operation, the hydrophone 17 is placed in the container 11 and is immersed in the liquid pool 15. Elastic waves are produced in the liquid pool by means of the vibration drive means acting through the table 25. During vibration, the hydrophone 17 is kept motionless. The depth L of the pool 15 is easily measured. The depth $h$ of the sensitive element 19 may be measured either directly or by plotting the output voltage of the hydrophone at several depths measured to an arbitrary point on the hydrophone, at a low frequency and fixed acceleration, and extrapolating the plot to zero output to thereby locate the sensitive element 19 relative to the arbitrary point.

With the liquid density $\rho$ and the velocity $c$ known, (depending on the liquid used in the testing), the sensitivity M in volts per unit of pressure of the hydrophone may be calculated as follows:

$$M = \left(\frac{E_h}{E_a}\right)\left(\frac{S_a}{\rho h}\right)\frac{(\omega h/c) \cos (\omega L/c)}{\sin (\omega h/c)} \quad (6)$$

where $S_a$ is the sensitivity in volts per unit of acceleration of the accelerometer 29 and $E_h$ and $E_a$ are respectively the output voltages of the hydrophone 17 being tested and of the accelerometer 29. $E_h$ is, of course, read from the voltmeter 21 during testing, and similar means may be provided for reading the accelerometer output voltage $E_a$. In terms of comparison with actual "free-field" tests carried out in open water, an AX-58 hydrophone calibrated according to the arrangement of this invention in an open-top container 6 inches in diameter and 20 inches showed agreement in sensitivity calibration within ½ db in a frequency range of from about 100 c.p.s. to about 700 c.p.s.

Thus it is seen that the present invention affords accurate calibration of hydrophones closely approximating free field calibration. Yet, by the present novel arrangement, the expense and inconvenience of making free field hydrophone calibrations are not required, the equipment associated with calibration arrangement according to the invention is inexpensive, simple, and readily available.

Obviously many modifications and variations of the present invention are possible in the light of the above teachings. It is therefore to be understood that within the scope of the appended claims the invention may be practiced otherwise than as specifically described.

We claim:

1. The method of calibrating a hydrophone to closely approximate free field testing of said hydrophone, comprising the steps of:
   immersing the hydrophone so that its sensitive element is at a depth $h$ in a column of liquid of depth L the speed of elastic waves in said liquid being $c$, and the liquid density being $\rho$;
   transmitting vibrations to the liquid to produce elastic waves therein while holding the hydrophone motionless, whereby there is produced acoustic pressure in liquid column measurably affecting the hydrophone output, and
   measuring the acceleration displacement amplitude of the vibrations imparted to the liquid column at a frequency $\omega$.

2. The method of according to claim 1 but further characterized by the step of:
   providing an electrical output representing the acoustic pressure acting on said hydrophone.

3. The method according to claim 2 but further characterized by the step of:
   calculating the sensitivity M of the hydrophone according to the local wave-effect-compensated relationship $$M = \left(\frac{E_h}{E_a}\right)\left(\frac{S_a}{\rho h}\right)\frac{(\omega h/c) \cos (\omega L/c)}{\sin (\omega h/c)}$$

where $E_h$ and $E_a$ are respective output voltages related to the forces acting on the hydrophone and to the acceleration amplitude displacement, and $S_a$ is the degree of accuracy or sensitivity relating to the measuring of the acceleration amplitude displacement.

4. A hydrophone calibrator comprising:
   container means;
   a pool of liquid of depth L for said container means;
   the hydrophone being immersed with its sensitive element at a depth $h$ in said container means;
   means for imparting vibrations of circular radian frequency $\omega$ to the bottom of said container means thereby producing elastic waves in said liquid pool and thus producing acoustic pressure acting on said hydrophone;
   first means having a sensitivity $S_a$ for indicating a value $E_a$ representing the acceleration amplitude displacement of the vibrations imparted to the container means and second means connected to the hydrophone for producing an output having a value $E_h$ representing the acoustic pressure acting on said hydrophone.

5. The hydrophone calibrator according to claim 4 but further characterized by said container means comprising:
   means for liquid-tightly sealing said container for withstanding high pressure differentials;
   means for introducing into said sealed container a fluid under greater-than-atmospheric pressure for simulating below-sea-level depths for said immersed hydrophone during calibration.

6. The hydrophone calibrator according to claim 5 wherein said first means is an accelerometer.

7. The hydrophone calibrator according to claim 5 wherein said first means is an optical system, said optical system comprising:
   a reticle located on the outer surface of said container means;
   a strobe directed to illustrate said reticle; and
   optical means receiving reflected light from said strobe for measuring the displacement of said reticle.

8. A calibrator for a hydrophone, said hydrophone having output means for representing the values of forces acting thereon, said calibrator comprising:
   container means;
   means for imparting essentially vertical vibratory motion to said container means;
   means for measuring the acceleration displacement amplitude of the vibrations imparted to said container means;
   whereby when said container means is provided with a pool of liquid and the hydrophone is immersed therein, the vibratory motion of said container means produces elastic waves in the liquid pool of intensity sufficient to measurably affect the output of the hydrophone representing acoustic forces due to the elastic waves acting on the hydrophone.

9. The calibrator according to claim 8 but further characterized by said container means comprising:
   means for fluid-tightly sealing said container for withstanding high pressure differentials; and
   means for introducing into said sealed container a fluid under greater-than atmospheric pressure for providing a calibration environment simulating below-sea-level depths for said immersed hydrophone during calibration.

10. A hydrophone calibrator for providing calibration of a hydrophone in a manner to closely approximate free-field calibration of the hydrophone, said hydrophone having a sensitive or active element therein connected to means for producing an output corresponding to acoustic pressure acting on said hydrophone, said calibrator comprising:
    a metallic container having walls of sufficient thickness to withstand high pressure differentials, said container having a mechanical resonance frequency below the lowest frequency of interest for calibration purposes;
    vibration producing means for imparting vertical vibrations to the bottom of said container, whereby upon introduction of liquid into said container elastic waves are produced of sufficient intensity in the liquid to measurably affect the output of the hydrophone when immersed in said liquid;
    vibratory displacement amplitude measuring means coupled to the bottom portion of said container for vibratory motion therewith to provide a measure of output displacement amplitude; and means for freely suspending the hydrophone in the container.

11. The calibrator according to claim 10 but further characterized by said vibratory displacement amplitude measuring means comprising a vibration transmitting housing vibratorily coupling said vibration producing means to the bottom of said container, and an accelerometer having its pickup element vibratorily coupled to said housing.

12. The calibrator according to claim 11 but further characterized by said container including cap means for fluidtightly sealing said container to withstand pressure differentials equal to those occurring at below-sea-level depths, said cap means including a stuffing tube for sealing said means for freely suspending the hydrophone; and means for introducing into said sealed container a fluid under higher-than-atmospheric pressure for simulating below-sea-level depths for said hydrophone when immersed during calibration.

13. The calibrator according to claim 10 but further characterized by said acceleration displacement amplitude measuring means comprising:

a reticle mounted on the outside of the container at its bottom portion;

a strobe having its radiation directed toward the reticle; and optical means focused for receiving radiation reflected by said reticle from said strobe for providing a readout indication of the displacement amplitude.

14. The calibrator according to claim 13 but further characterized by said container including cap means for fluidtightly sealing said container to withstand pressure differentials equal to those occurring at below-sea-level depths, said cap means including a stuffing tube for sealing said means for freely suspending the hydrophone; and means for introducing into said sealed container a fluid under higher-than-atmospheric pressure for simulating below-sea-level depths for said hydrophone when immersed during calibration.

References Cited by the Examiner

OTHER REFERENCES

Laufer, et al.: Journal of The Acoustical Society of America, vol. 28, No. 5, September 1956, pages 951 to 958.

LOUIS R. PRINCE, *Primary Examiner.*

S. CLEMENT SWISHER, *Assistant Examiner.*